United States Patent [19]
Bladel et al.

[11] Patent Number: 6,149,978
[45] Date of Patent: Nov. 21, 2000

[54] COATING OF POROUS, HYDROPHOBIC SUBSTRATES WITH THERMOPLASTIC FLUOROPOLYMERS

[75] Inventors: Hermann Bladel, Emmerting; Ludwig Mayer, Burghausen; Manfred Schmid, Augsburg, all of Germany

[73] Assignee: Dyneon GmbH, Burgkirchen, Germany

[21] Appl. No.: 08/200,068

[22] Filed: Feb. 22, 1994

[30] Foreign Application Priority Data

Feb. 24, 1993 [DE] Germany ............................ 43 05 618

[51] Int. Cl.[7] ....................................... B05D 3/02
[52] U.S. Cl. ..................... 427/375; 427/379; 427/388.4
[58] Field of Search ................... 427/375, 379, 427/385.5, 388.1, 388.4, 135, 189, 193

[56] References Cited

U.S. PATENT DOCUMENTS

| | | | |
|---|---|---|---|
| 3,142,665 | 7/1964 | Cardinal et al. | 260/92.1 |
| 3,819,594 | 6/1974 | Holmes et al. | |
| 4,051,275 | 9/1977 | Forestek | 427/201 |
| 4,123,401 | 10/1978 | Berghmans et al. | 260/29.6 F |
| 4,204,021 | 5/1980 | Becker | 427/193 |
| 4,252,859 | 2/1981 | Concannon et al. | 428/422 |
| 4,342,675 | 8/1982 | Gangal | 524/762 |
| 4,366,191 | 12/1982 | Gistinger et al. | 427/228 |
| 4,375,505 | 3/1983 | Newkirk | 430/99 |
| 4,395,445 | 7/1983 | Gebauer et al. | 427/407.1 |
| 4,504,528 | 3/1985 | Zucker et al. | 427/389.8 |
| 4,774,137 | 9/1988 | Alberts et al. | 427/189 |
| 5,194,484 | 3/1993 | Logothetis | 524/494 |

FOREIGN PATENT DOCUMENTS

| | | |
|---|---|---|
| 0 014 974 | of 1980 | European Pat. Off. |
| 247243 | 12/1987 | European Pat. Off. |
| 296559 | 12/1988 | European Pat. Off. |
| 2 124 305 | 9/1972 | France |
| 2275310 | 1/1976 | France |
| 41 24 730 | 1/1993 | Germany |
| 4124730 | 1/1993 | Germany |
| 1 348 775 | 3/1974 | United Kingdom |
| 1 371 984 | 10/1974 | United Kingdom |
| 2 084 486 | 4/1982 | United Kingdom |
| 80/00929 | 5/1980 | WIPO |

OTHER PUBLICATIONS

Translation of DE 41 24730, Jan. 1993.
Encyclopedia of Polymer Sci. and Eng., Second Edition, vol. 16, 577–648, 1989.

*Primary Examiner*—Erma Cameron
*Attorney, Agent, or Firm*—Connolly Bove Lodge & Hutz, LLP

[57] ABSTRACT

If hydrophobic substrates are coated—if appropriate under pressure—with an aqueous dispersion of a thermoplastic fluoropolymer having a number-average particle size of up to 100 nm and the fluoropolymer is fixed on the substrate thus impregnated by heat treatment, firmly adhering coatings are obtained.

14 Claims, No Drawings

COATING OF POROUS, HYDROPHOBIC SUBSTRATES WITH THERMOPLASTIC FLUOROPOLYMERS

DESCRIPTION

The invention relates to a process for coating porous, hydrophobic, metallic and non-metallic substrates with thermoplastic fluoropolymers, i.e. fluoropolymers which can be processed from the melt, and to the coated substrates.

DE-A 41 24 730 discloses a process in which fluoropolymers, in a form in which their particles or those of a precursor are smaller in at least one dimension than the diameter of pores or capillaries of a microporous oxidic surface which has been produced by anodic oxidation of objects of aluminum, magnesium or alloys thereof, are embedded in this surface. The preferred fluoropolymer is polytetrafluoroethylene, which, as is known, cannot be processed from the melt. Suitable fluoropolymers which are mentioned are the polymers and copolymers of tetrafluoroethylene, hexafluoropropene, vinylidene fluoride, vinyl fluoride and trifluorochloroethylene, in particular homopolymers thereof and tetrafluoroethylene copolymers. The polymer particles or the precursors thereof should have a particle size of 1 to 50 nm, preferably 1 to 10 nm. The powders or suspensions, which are not commercially available, are to be obtained by colloid grinding processes or by correspondingly shortened polymerization times. The fluoropolymer precursor to be embedded can be a fluoromonomer or oligomer which is polymerized in the pores or on the coating.

The surfaces to be coated according to DE-A 41 24 730 are preferably freshly produced oxidized surfaces which have a high chemical reactivity. In contrast, the invention relates to coating of hydrophobic surfaces of little or even no reactivity. Preferred substrates are materials which are subjected to severe chemical and/or thermal stresses and are employed, for example, in chemical apparatus construction, such as carbides, borides, suicides and similar materials. Preferred substrates are shaped articles of non-graphitic carbon, of graphite or of silicon carbide, which are porous in their starting state, in spite of their fine-grained structure. To render these shaped articles impermeable to liquid or gas, their pore system must be at least partly filled with synthetic resins. For many uses, it is also advantageous for these articles additionally to be provided with a surface film of synthetic resin. The use of the shaped articles in highly reactive, aggressive, for example oxidizing, media in particular requires impregnation, which not only at least largely fills up the pores, but also produces a firmly adhering coating on the surfaces.

Fluoropolymers are known to be suitable for such coatings. However, the processes and coating agents known to date have not proved suitable for hydrophobic substrates, since these substances do not penetrate deeply enough into the pore system of the articles and the coatings are therefore not sufficiently anchored. If correspondingly finely divided dispersions are employed and the coated substrates are heated for fixing, fluoropolymers which cannot be processed from the melt, such as polytetrafluoroethylene, require such high temperatures that damage to the substrate may occur.

These disadvantages are overcome by the process according to the invention, which also produces such effective coatings on porous, hydrophobic substrates that correspondingly treated shaped articles can be employed in chemical apparatus construction even in the presence of aggressive media.

In the process according to the invention, a hydrophobic substrate is brought into contact with an aqueous dispersion of a thermoplastic fluoropolymer having a number-average particle size of up to 100 nm, if appropriate under pressure, and the article thus impregnated is after-treated with heat in order to fix the fluoropolymer. Preferred embodiments of this process are described in more detail below and defined in the patent claims.

The aqueous suspension of the fluoropolymer preferably comprises particles having a number-average particle size of up to 50 nm, advantageously up to 40 nm, in particular up to 30 nm. The lower limit of the particle size is about 1 nm, preferably 10 nm.

The choice of fluoropolymer depends on the requirements: if the chemical resistance requirements are high, a copolymer of tetrafluoroethylene with a fluoroalkyl perfluorovinyl ether, for example a bipolymer having units of the formula $X—(CF_2)_n—O—CF=CF_2$, in which X is hydrogen, chlorine or, preferably, fluoro and n is a number from 1 to 8, preferably 1 to 3, is chosen as the fluoropolymer. If the chemical resistance requirements of the coating are lower, less expensive fluoropolymers, such as copolymers of tetrafluoroethylene with ethylene, are suitable.

The fixing conditions depend on the apparatuses available, and if necessary can easily be determined by simple preliminary experiments. In general, the shaped article is initially exposed to a vacuum and is then, while maintaining the reduced pressure, brought into contact with the aqueous dispersion, if necessary under pressure, for example under about 10 to 100 bar, and the excess aqueous dispersion is removed after the pressure has been released. Thermal fixing is preferably carried out in two stages, first at a low temperature of the order of 100 to 150° C. and then at a sufficiently high temperature to ensure sintering or fusion of the fluoropolymer to form a coating which is as dense as possible.

Preferred embodiments of the invention will be explained in more detail in the following examples. Examples 1 to 5 here are preparation examples for a preferred dispersion of a bipolymer of tetrafluoroethylene with perfluoro(propyl vinyl) ether, which is particularly suitable for coatings which are highly resistant to chemicals.

EXAMPLES 1 to 5

118 l of desalinated water are introduced into a polymerization reactor which is enameled on the inside, has a total volume of 195 l and is equipped with an impeller stirrer, and 620 g of ammonium perfluorooctanoate (POA, in the form of 2000 g of a 31% strength solution in water, commercial product from 3M) are dissolved therein. After the reactor has been sealed, it is rinsed first five times with nitrogen and then once with 1.0 bar of tetrafluoroethylene.

After depressurizing and heating up to 68° C., 50 g of methylene chloride and 610 g of perfluoropropyl perfluorovinyl ether (PPVE; 0.75 bar) are pumped in via a line, while stirring moderately. Stirring is then increased to 170 revolutions per minute. Tetrafluoroethylene (TFE) is then fed to the reactor via the gas phase until a total pressure of 13.4 bar is reached. Thereafter, the polymerization is started by pumping in 4.0 g of ammonium persulfate (APS), dissolved in 300 ml of desalinated water.

As soon as the pressure starts to fall, further TFE and PPVE are subsequently added via the gas phase according to consumption, such that the total pressure of 13.4 bar is maintained. The heat liberated is removed by cooling the reactor wall and a temperature of 68° C. is thus maintained.

After 35.7 kg of TFE have been fed (in the course of 4.1 hours) into the reactor, the monomer feed is interrupted and the reactor is depressurized and flushed several times with $N_2$.

The resulting polymer dispersion is drained off at the base of the reactor. 154.5 kg of a bipolymer dispersion having a solids content of 23.8% by weight, a content of PPVE of 4.1% by weight (1.54 mol %) and a melt flow index (MFI, determined in accordance with DIN 53 735/ASTM 1268-62 T: load applied 5 kg, 372° C.) of 1.6 are obtained. The melting point is 305° C. and the particle size distribution is 31 nm (weight-average distribution) and 25 nm (number-average distribution).

The examples shown in the following table were carried out analogously:

TABLE

| Example | POA [g] | $CH_2Cl_2$ [g] | TFE [bar] | PPVE [bar] | APS [g] | Running time [hours] | Stirrer speed [rpm] | Final pressure [bar] | Dispersion [kg] | Solids content [% by weight] | MFI | PPVE [% by weight) | Weight-average [nm] | Number-average [nm] |
|---|---|---|---|---|---|---|---|---|---|---|---|---|---|---|
| 2 | 600 | 50 | 12.3 | 0.79 | 4 | 4.4 | 176 | 13.4 | 151.4 | 22.0 | 2.0 | 4.3 | 22 | 17 |
| 3 | 600 | 50 | 12.5 | 0.61 | 4 | 4.0 | 170 | 9.6 | 146.6 | 19.6 | 3.5 | 4.9 | 29 | 23 |
| 4 | 450 | 50 | 12.5 | 0.62 | 4 | 4.3 | 170 | 12.6 | 154.7 | 23.6 | 2.6 | 3.8 | 36 | 28 |
| 5 | 600 | 250 | 12.1 | 0.76 | 8 | 4.1 | 210 | 13.4 | 149.4 | 20.6 | 17 | 4.7 | 26 | 21 |

EXAMPLE 6

A graphite for apparatus construction, flexural strength 40 $N/mm^2$, pore volume 5%, average pore diameter 0.1 $\mu m$, permeability coefficient $10^{-4}$ $cm^2/s$ (obtainable from Ringsdorff-Werke GmbH, Bonn-Mehlem) was introduced into an impregnating autoclave operating by the vacuum/pressure process. After the autoclave had been closed, the inside of the autoclave was evacuated for 15 hours by means of an oil-sealed rotary disc pump. While maintaining the vacuum, the graphite article was then coated with a dispersion according to Example 1 by slowly allowing this dispersion to run in, and after the graphite article had been coated completely, the pressure was increased to 10 bar in the course of 100 minutes. This pressure was maintained over a period of 144 hours. The pressure was then slowly released (over a period of more than 5 minutes) to normal pressure, the dispersion which remained in the autoclave was drained off and the article was removed from the autoclave.

To fix the polymer coating, the graphite article was then first kept in an oven at a temperature of 120° C. for 24 hours, and then heated at 360° C. for 1 hour. The impregnated graphite article thus produced had a gas permeability of $5 \times 10^{-6}$ $cm^2/s$. It had a firmly adhering polymer layer on the surface, which was additionally anchored firmly to the article by the polymer which had penetrated into the pores of the article. The article showed an excellent resistance to aggressive chemicals, such as 80% strength sulfuric acid at the boiling point (about 202° C.), 10% strength nitric acid at the boiling point (about 104° C.) or 10% strength sodium hydroxide solution at the boiling point (about 102° C.).

EXAMPLE 7

An article made of a graphite grade having the parameters of flexural strength of 35 $N/mm^2$, pore volume of 12 to 14% and average pore diameter of 1 to 3 $\mu m$ and which was permeable to gas and liquid (obtainable from Ringsdorff-Werke GmbH, Bonn-Mehlem) was impregnated using the same impregnating conditions and the same impregnating agent as have been described under Example 6, and the polymer introduced by impregnation was fixed in the same manner as described under Example 6. After treatment the finished article had a permeability of $10^{-5}$ $cm^2/s$, had a firmly adhering polymer layer which was also firmly anchored in the pores of the surfaces and could no longer be detached without destruction, and was likewise resistant to the agents mentioned in Example 6.

EXAMPLE 8

A block heat exchanger having a diameter of 260 mm and a height of 255 mm with channels for carrying the product of 8 mm diameter and channels for carrying the coolant of 8 mm diameter made of the apparatus construction graphite also used in Example 6 was provided with a surface coating of the bipolymer in the same manner as has been described in Example 6. The only difference from the procedure according to Example 6 was that the impregnated heat exchanger block had been kept at a temperature of 120° C. for 48 hours instead of 24 hours during fixing of the coating. The ready-treated block was impermeable to gas (charging with 2 bar of air under water) and liquid (charging with 8 bar of water on the product side against air under normal pressure) and was resistant to sulfuric acid, nitric acid and sodium hydroxide solution in the same manner as has been described for the articles of Examples 6 and 7.

EXAMPLE 9

An apparatus construction graphite of the grade which has been described in Example 6 was impregnated under the same process conditions as described in Example 6 using a polymer dispersion having a composition of 95.9% of TFE units and 4.1% of PPVE units with a solids content of 23% by weight, a particle size of 90 to 100 nm and a melt flow index MFI (DIN 53735, ASTM 1268-62 T) of the dispersed solid of 18 g/10 minutes, and provided with a coating by fixing the polymer introduced and applied by the impregnation. The permeability of the article in this case was $10^{-5}$ $cm^2/s$. The polymer coating deposited was not anchored in the pores starting from the surface as well as the coating according to Example 6, but still adhered sufficiently well. The resistance to the agents already described was unchanged in comparison with the results described in Examples 6, 7 and 8.

EXAMPLE 10

The procedure described in Example 9 was carried out using an article of the graphite quality also used in Example 7 (flexural strength 35 $N/mm^2$, pore volume 12 to 14%, average pore diameter 1 to 3 $\mu m$, permeable to gas and liquid), with the dispersion characterized under Example 9. The permeability of the coated article was $5 \times 10^{-5}$ $cm^2/s$.

The polymer coating deposited adhered sufficiently well to the surface of the article. The resistance to the agents mentioned in the above examples was equally good.

EXAMPLE 11

A silicon carbide component, pore volume accessible to liquid 4%, average pore diameter 0.5 μm (EKasic D quality, supplier Elektroschmelzwerk Kempten) and having the dimensions 50×25×5 mm was impregnated in an autoclave by the vacuum/pressure method with the dispersion used in Example 6 under the following conditions: The article in the autoclave was evacuated by means of an oil-sealed rotary disc pump for 15 hours and then slowly coated with the dispersion. An impregnating pressure of 10 bar was then built up by a linear increase in the course of 100 minutes, and was maintained for a period of 72 hours. The autoclave was subsequently let down to atmospheric pressure in the course of 5 minutes, the impregnating liquid was drained off and the article was removed from the autoclave. For fixing the polymer introduced into the article and applied to the article, the article was first heat-treated at 120° C. for 24 hours and then at 360° C. for 1 hour. After this treatment, the article had a polymer coating which was impermeable to gas and liquid, adhered firmly over its entire surface and was additionally anchored firmly in the pores. The penetration depth of the polymer into the pores accessible from the surface was on average 0.4 mm. The resistance to the chemicals already mentioned in the above examples was also excellent here, as has been described in those examples.

What is claimed is:

1. A process for coating porous hydrophobic substrates with fluoropolymers, which comprises bringing a porous hydrophobic substrate into contact with an aqueous dispersion of a thermoplastic fluoropolymer having a number-average particle size of up to 100 nm and said thermoplastic fluoropolymer being a copolymer containing a sufficient amount of co-monomer other than tetrafluoroethylene in order to provide its thermoplastic properties, so that said thermoplastic fluoropolymer is processable from a melt, impregnating the substrate with the dispersion forming an article, and then after-treating the article thus impregnated with heat to adhere the fluoropolymer to the substrate.

2. The process as claimed in claim 1, wherein the impregnating of the substrate with the dispersion takes place under a pressure which is increased above atmospheric pressure.

3. The process as claimed in claim 1, wherein the after-treatment with heat is carried out to form a coating on the substrate, first at a temperature of 100 to 150° C. and then at a sufficiently high temperature to ensure sintering or fusion of the fluoropolymer and to densify said coating.

4. The process as claimed in claim 1, wherein the number-average particle size in the fluoropolymer dispersion is up to 50 nm.

5. The process as claimed in claim 1, wherein the number-average particle size in the fluoropolymer dispersion is up to 30 nm.

6. The process as claimed in claim 1, wherein the fluoropolymer is a copolymer with units of tetrafluoroethylene and a fluoroalkyl perfluorovinyl ether.

7. The process as claimed in claim 6, wherein the copolymer additionally contains units of hexafluoropropene.

8. The process as claimed in claim 6, wherein said thermoplastic fluoropolymer contains more than about 3% by weight of perfluoropropyl perfluorovinyl ether units.

9. The process as claimed in claim 1, wherein said substrate comprises carbon, a carbide, boride, or silicide.

10. The process as claimed in claim 4, wherein the number-average particle size in the fluoropolymer dispersion is from about 1 to 40 nm.

11. The process as claimed in claim 10, wherein the number-average particle size of the fluoropolymer dispersion is from 10 nm to 30 nm.

12. The process as claimed in claim 11, wherein the fluoropolymer contains tetrafluoroethylene units and comonomer units of the formula $$X-(CF_2)_n-O-CF=CF_2$$

in which

X is hydrogen, chlorine or fluorine and n is a number from 1 to 8.

13. The process as claimed in claim 12, wherein X is fluorine and n is a number from 1 to 3.

14. The process as claimed in claim 2, wherein said pressure is from about 10 to 100 bar.

* * * * *

UNITED STATES PATENT AND TRADEMARK OFFICE
CERTIFICATE OF CORRECTION

PATENT NO. : 6,149,978
DATED : Nov. 21, 2000
INVENTOR(S) : Hermann Bladel et al

It is certified that error appears in the above-identified patent and that said Letters Patent is hereby corrected as shown below:

On page, item

"[73] Assignee: Dyneon GmbH, Burgkirche, Germany and
SGL Technik GmbH, Frankfurt, Germany" should read --[73] Assignee: Dyneon GmbH, Burgkirchen, Germany and
SGL Technik GmbH, Meitingen, Germany--

Signed and Sealed this

Twenty-ninth Day of May, 2001

Attest:

NICHOLAS P. GODICI

*Attesting Officer*  *Acting Director of the United States Patent and Trademark Office*